A. E. STOVE.
HOSE COUPLING.
APPLICATION FILED JUNE 2, 1919.
1,323,117.
Patented Nov. 25, 1919.
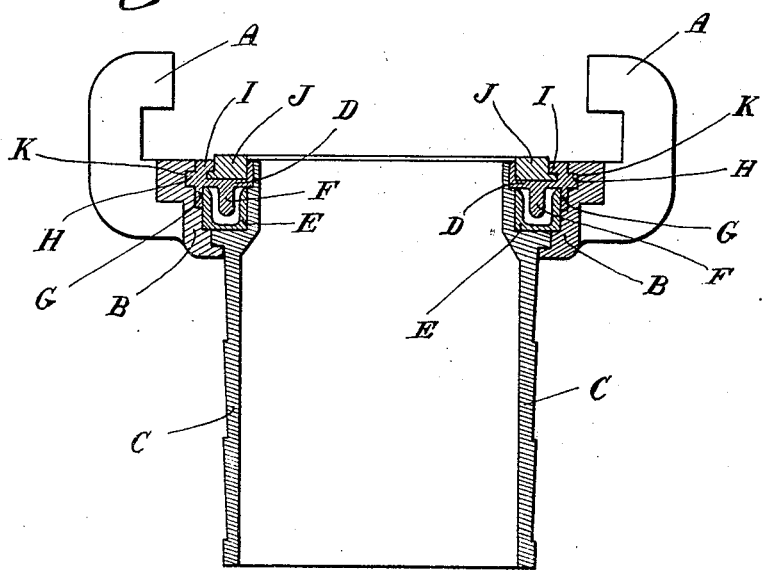
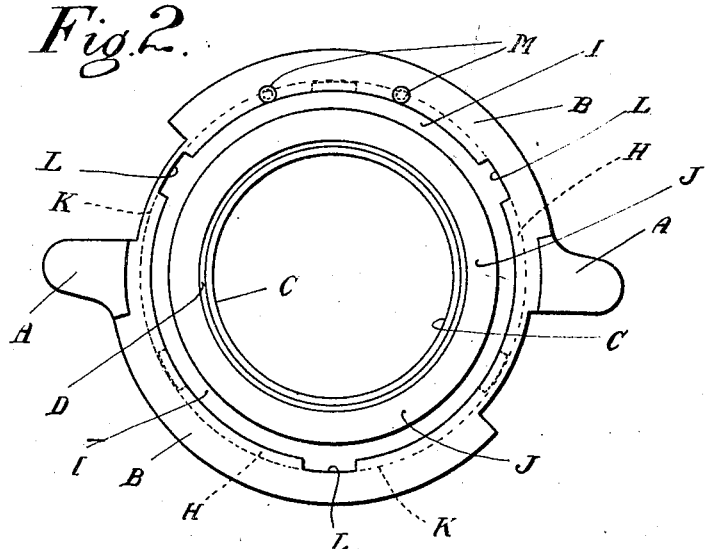
Witnesses:
Inventor
Alfred E. Stove
by
Attorney

UNITED STATES PATENT OFFICE.

ALFRED EDWIN STOVE, OF LONDON, ENGLAND.

HOSE-COUPLING.

1,323,117. Specification of Letters Patent. Patented Nov. 25, 1919.

Application filed June 2, 1919. Serial No. 301,223.

*To all whom it may concern:*

Be it known that I, ALFRED EDWIN STOVE, a subject of the King of Great Britain, residing at London, England, have invented certain new and useful Improvements Connected with Hose-Couplings, of which the following is a specification.

This invention relates to that class of hose couplings in which a washer of U-shaped cross-section is employed to prevent leakage at the joints and particularly to that class which are known as interchangeable hose couplings and in which the locking parts are the same at both ends of the hose pipe and revolve around the other parts leaving the sleeves to which the hose pipes are secured free to revolve.

The object of my invention is to improve the construction of hose couplings in such a manner that they are more efficient and have fewer parts and cannot leak or blow out under any pressure and since the parts are devoid of screw threads on the parts they are more readily assembled in manufacture and are less liable to damage in use. Further all loose parts are free to revolve, thus allowing the hose to straighten itself.

I show in the drawing the improvements as applied to the type of interchangeable coupling having inclined planes and claws or catches for holding the two parts together.

With reference to the annexed drawings—

Figure 1 is a longitudinal section of the half coupling.

Fig. 2 a plan view of the half coupling.

It is understood that with the construction both half couplings are alike.

A, A are claws, or catches projecting from a ring B and engaging the corresponding ring of a complemental half coupling and C is the sleeve rotatable in the ring B as is well known.

Now my invention consists of an improved form of joint between the ring B and sleeve C and comprises an improved type of washer ring D in conjunction with a U shaped washer E which prevents all liquid or fluid passing the joints between the ring B and sleeve C. The improved washer ring D is of U shape in cross-section having a depending web F on its under side, a depending flange G adjacent its outer edge and tongues H on its periphery, one of the walls being preferably turned inward as at I to engage a flange of a flat front washer J to hold such washer in the depression of the U shaped ring D, the ring D fitting within the ring B and surrounding the sleeve C and seated against shoulders formed within the ring B and upon the sleeve C.

The functions of the ring D are (1) to provide a holder for the flat front washer J (2) to direct the flow of liquid or fluid to the lower washer E by means of the web F, which assists in maintaining a watertight joint by dividing the water in the washer E and also assists in helping the washer to maintain its proper shape and (3) to provide improved means of securing all the parts in place, such means consisting of the projecting tongues H engaging in a groove K cut in the ring B. Slots L are formed in the ring B and communicate with the groove K to permit of the passage of the tongues H of the washer ring D when inserted in the ring B. When inserted in the ring B, the washer ring D is partially located so that the projecting tongues H enter the groove K and after such insertion small set pins M in the ring B engage and secure the washer ring D in place thus preventing the tongues H from again reaching the slots L, but permitting the washer ring D to move through part of the distance, thus allowing the flat washers J of the abutting couplings to adjust themselves to one another when coupled up. It will be seen that sleeve C is free to revolve at all times.

The joint is completed by the rubber or leather washer E, also U-shaped in cross-section, which is so located that liquid escaping past the ring D is directed into the recess or depression in the washer E, thereby compressing and expanding said washer between the interior of the ring B and the exterior of the sleeve C and preventing any escape of liquid between the ring B and sleeve C.

What I do claim as my invention and desire to secure by Letters Patent, is:—

1. A joint for hose couplings, comprising a ring having a depression in one of its faces and a web projecting from its opposite face and also having tongues extending from its periphery; a washer seated in said depression; a coupling ring carrying means for engaging a complemental coupling member and having an internal groove to receive the tongues of said first-named ring and also having slots in one of its faces communicating with said groove to permit of the insertion and removal of said tongues; means carried by one of said rings and engaging the other to limit the relative rotation thereof; a second washer having a depression in one of its faces to receive the web of said first-named ring; and a sleeve having one end projecting within said rings and said second named washer and provided with shoulders engaging said rings and washer.

2. A joint for hose couplings, comprising a sleeve provided with an external flange and a pair of external shoulders between said flange and one of its ends; a coupling ring surrounding the shouldered end of said sleeve having an internal groove and slots in one of its faces communicating with said groove, an internal flange engaging the flange on the sleeve, and a pair of internal shoulders, and provided with means to engage a complemental coupling ring; a washer between said coupling ring and said sleeve having a depression and resting on one of the external shoulders of said sleeve and one of the internal shoulders of said ring; a second ring between said first-named ring and said sleeve, resting on one of the shoulders of said ring and one of the shoulders of said sleeve, having a depression in one of its faces and a web and a flange projecting from its other face adapted, respectively, to enter the depression in said washer and to surround said washer, and provided on its periphery with tongues for insertion through the slots in the first-named ring into the groove of the latter; and a washer in the depression in said last-named ring.

In testimony whereof I have hereunto set my hand in presence of two subscribing witnesses.

ALFRED EDWIN STOVE.

Witnesses:
 FRED E. HUTCHINS,
 WM. O. BROWN.